(12) United States Patent
Ball

(10) Patent No.: US 8,272,158 B1
(45) Date of Patent: Sep. 25, 2012

(54) FISHING NET RELEASE DEVICE

(76) Inventor: Franklin L. Ball, Sebastian, FL (US)

( * ) Notice: Subject to any disclaimer, the term of this patent is extended or adjusted under 35 U.S.C. 154(b) by 41 days.

(21) Appl. No.: 12/789,978

(22) Filed: May 28, 2010

(51) Int. Cl.
*A01K 74/00* (2006.01)

(52) U.S. Cl. ............... 43/8; 43/7; 224/101; 224/247; 224/257

(58) Field of Classification Search ............... 43/7, 8; 224/101, 191, 600, 602–605, 247, 257, 258
See application file for complete search history.

(56) References Cited

U.S. PATENT DOCUMENTS

| | | | | | |
|---|---|---|---|---|---|
| 118,294 | A | * | 8/1871 | Stevens | 63/21 |
| 846,953 | A | * | 3/1907 | Rosenthal | 2/175.7 |
| 967,664 | A | * | 8/1910 | Peterson | 24/265 H |
| 1,024,653 | A | * | 4/1912 | Sargent | 43/11 |
| 1,344,500 | A | * | 6/1920 | Giardino | 24/510 |
| 1,384,666 | A | * | 7/1921 | Lamont | 24/191 |
| 2,169,080 | A | * | 8/1939 | Clark | 224/639 |
| 2,487,339 | A | * | 11/1949 | Kindlund et al. | 24/3.11 |
| 2,563,275 | A | * | 8/1951 | Renwick, Jr. | 43/42.27 |
| 2,572,889 | A | * | 10/1951 | Strykower | 224/258 |
| 2,578,237 | A | * | 12/1951 | Geistweit | 43/11 |
| 2,723,481 | A | * | 11/1955 | Schwartz, Sr. | 43/7 |
| 3,213,560 | A | * | 10/1965 | Phillips | 43/7 |
| 3,326,430 | A | * | 6/1967 | Banks | 224/257 |
| 3,462,870 | A | * | 8/1969 | Terilli | 43/8 |
| 3,772,740 | A | | 11/1973 | Seron | |
| 4,186,690 | A | * | 2/1980 | Seiler | 119/772 |
| 4,324,061 | A | * | 4/1982 | Stepp | 43/8 |
| 4,522,572 | A | * | 6/1985 | Hahn | 43/16 |
| 4,607,448 | A | * | 8/1986 | Brief | 43/8 |
| 4,712,389 | A | * | 12/1987 | Innis | 63/1.14 |
| 4,779,778 | A | * | 10/1988 | Nixon, II | 224/269 |
| 4,790,098 | A | * | 12/1988 | Lu | 43/7 |
| 4,795,069 | A | * | 1/1989 | Ferrill | 224/257 |
| 4,847,729 | A | * | 7/1989 | Hee | 224/175 |
| 4,991,236 | A | * | 2/1991 | Pritchett | 2/195.8 |
| 5,065,919 | A | * | 11/1991 | Sims | 224/257 |
| 5,077,927 | A | * | 1/1992 | Derryberry | 43/4 |
| 5,092,018 | A | * | 3/1992 | Seron | 24/3.4 |
| 5,276,989 | A | * | 1/1994 | Lumb et al. | 43/7 |
| 5,459,903 | A | * | 10/1995 | Treacy | 24/3.13 |
| 5,571,228 | A | * | 11/1996 | McMurtrie | 224/247 |
| 5,890,478 | A | * | 4/1999 | Dunmore | 224/257 |
| 5,979,100 | A | * | 11/1999 | Lee | 43/8 |
| 5,992,715 | A | * | 11/1999 | Habibi | 224/257 |
| 6,056,173 | A | * | 5/2000 | Gillespie | 224/247 |
| 6,378,577 | B1 | * | 4/2002 | Piner et al. | 224/257 |
| 6,425,167 | B1 | * | 7/2002 | Barbarite et al. | 24/298 |
| 6,474,012 | B1 | * | 11/2002 | Ardern | 43/8 |

(Continued)

*Primary Examiner* — Darren W Ark

(74) *Attorney, Agent, or Firm* — Montgomery Patent & Design, LLC; Robert C. Montgomery; Joseph Yaksich

(57) ABSTRACT

A device that assists in the holding and releasing of a cast net when thrown for fishing is herein disclosed. The device replaces the traditional practice of holding the edge of a casting net in a fisherman's mouth while throwing. The device is made of a section of synthetic cord wherein each end of the cord is attached to the outward leg of a clip mechanism, thus forming a loop configuration. The loop is then placed around the fisherman's neck with the clip mechanism hanging in a downward configuration. The cast net is then prepared to throw but instead of placing the edge of the net in the mouth, it is secured within the jaws of the clip. The net is then cast and as the net travels away from the fisherman, it pulls away from the clip resulting in a perfect cast.

2 Claims, 2 Drawing Sheets

U.S. PATENT DOCUMENTS

| | | | |
|---|---|---|---|
| 6,643,972 B2 * | 11/2003 | Prokaski | 43/8 |
| 6,675,446 B2 * | 1/2004 | Buettell | 24/122.6 |
| 6,691,904 B2 * | 2/2004 | Pineda | 223/81 |
| D541,523 S * | 5/2007 | Zoullas et al. | D3/215 |
| 7,334,714 B2 * | 2/2008 | Brown | 224/600 |
| 7,387,225 B2 * | 6/2008 | Fox | 224/258 |
| 7,614,531 B2 * | 11/2009 | Kawakita | 224/258 |
| 7,975,424 B1 * | 7/2011 | Shooter, II | 43/8 |
| 2001/0035440 A1 * | 11/2001 | Danielson | 224/191 |
| 2003/0056421 A1 * | 3/2003 | Ardern | 43/8 |
| 2004/0094592 A1 * | 5/2004 | Brown | 224/257 |
| 2004/0200119 A1 * | 10/2004 | Ardern | 43/8 |
| 2005/0039372 A1 * | 2/2005 | Amore | 43/8 |
| 2005/0217084 A1 * | 10/2005 | Behn et al. | 24/302 |
| 2006/0113345 A1 * | 6/2006 | Zoullas et al. | 224/600 |
| 2010/0258603 A1 * | 10/2010 | Swanson | 224/605 |
| 2011/0278333 A1 * | 11/2011 | Leach | 224/257 |
| 2012/0080469 A1 * | 4/2012 | Souders | 224/600 |

* cited by examiner

FISHING NET RELEASE DEVICE

RELATED APPLICATIONS

The present invention was first described in a notarized Official Record of Invention on May 7, 2009, that is on file at the offices of Montgomery Patent and Design, LLC, the entire disclosures of which are incorporated herein by reference.

FIELD OF THE INVENTION

The present invention relates generally to fishing nets, and in particular, to a device adapted for assisting a user in the casting of a fishing net.

BACKGROUND OF THE INVENTION

Fishing of various types is a popular and widespread activity. Two (2) of the most common methods for individuals to engage in fishing are by use of conventional fishing rods, and by use of large nets for capturing fishing. While rods are easily usable by an individual due to the fact that they are intended to target single fish, nets are adapted for entrapping multiple fish at the same time.

Due to the large and flaccid nature of nets, it is difficult for an individual user to cast nets properly. The process of attempting to throw a net often results in folded, tangled, or otherwise unsuitable configurations which diminish the utility of the net. Proper use of the net dictates that the net should be fully spread out and opened for maximum fish capturing capabilities. Many users result to unsatisfactory methods such as using their mouths to hold the net open during the throwing process. This method and other similar methods are obviously unsanitary and inconsistent.

Various attempts have been made to provide device which aid an individual in the casting of a fishing net. Examples of these attempts can be seen by reference to several U.S. patents. U.S. Pat. No. 4,324,061, issued in the name of Stepp, describes a casting net holding device which comprises a harness and fastening means for a portion of net prior to throwing.

U.S. Pat. No. 6,474,012, issued in the name of Ardern, describes a cast net throwing device which comprises a means for removable attachment to a net and a gripping means which aids a user in imparting a rotational motion to the net during casting.

U.S. Pat. No. 6,643,972, issued in the name of Prokaski, describes a device which assists a user in the throwing of a cast net. The Prokaski device comprises a disk shaped structure which holds open the center part of a net and provides a weighting means in order to assist a user in the propelling and subsequent spreading of a fishing net.

While these devices fulfill their respective, particular objectives, each of these references suffer from one (1) or more of the aforementioned disadvantages. Many such devices are cumbersome or uncomfortable to use. Also, many such devices increase the amount of time required during the casting process. Furthermore, many such devices are not easily retrievable or otherwise not quickly reusable for multiple casting operations. In addition, many such devices inhibit the functionality of the net after casting. Accordingly, there exists a need for a fishing net casting aid without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to release a fishing net in a manner which will help a user to achieve an even spread without inhibiting the speed, ease, or utility of casting. Thus, the object of the present invention is to solve the aforementioned disadvantages and provide for this need.

To achieve the above objectives, it is an object of the present invention to provide a means for throwing an existing conventional fishing casting net without risking injury, unsanitary conditions, and other undesirable situations.

Another object of the present invention is to provide a clipping means for securely anchoring a fishing net, resulting in an even spreading of the net while travelling away from a user. The clipping means comprises a conventional spring clip.

Yet still another object of the present invention is to allow a user to quickly fasten and unfasten a net to the spring clip. The spring clip comprises a conventional jaw assembly which a user may selectively release via depressing elongated portions of the jaws towards each other.

Yet still another object of the present invention is to securely anchor the device to a user during casting. The device comprises a cord which is securely attached to the spring clip via threading through an aperture in the clip.

Yet still another object of the present invention is to allow a user to achieve a desired length of the cord to comfortably fit the user by selectively tying a conventional knot in the cord after attachment to the clip.

Yet still another object of the present invention is to provide a method of utilizing the device that provides a unique means of selectively sizing the cord, placing the cord around a user's neck in order to provide a hands free anchoring means, opening the spring clip and placing it on an existing casting net, casting the net in a manner which provides even spreading and placement of the net, and quickly detaching the clip after casting.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | fishing net release device |
| 15 | cast net |
| 17 | user |
| 20 | spring clip |
| 21 | first elongated member |
| 22 | second elongated member |
| 23 | first jaw |
| 24 | second jaw |
| 25 | spring |
| 26 | aperture |
| 30 | cord |
| 35 | knot |

DETAILED DESCRIPTION OF THE PREFERRED EMBODIMENT

Figure 1:
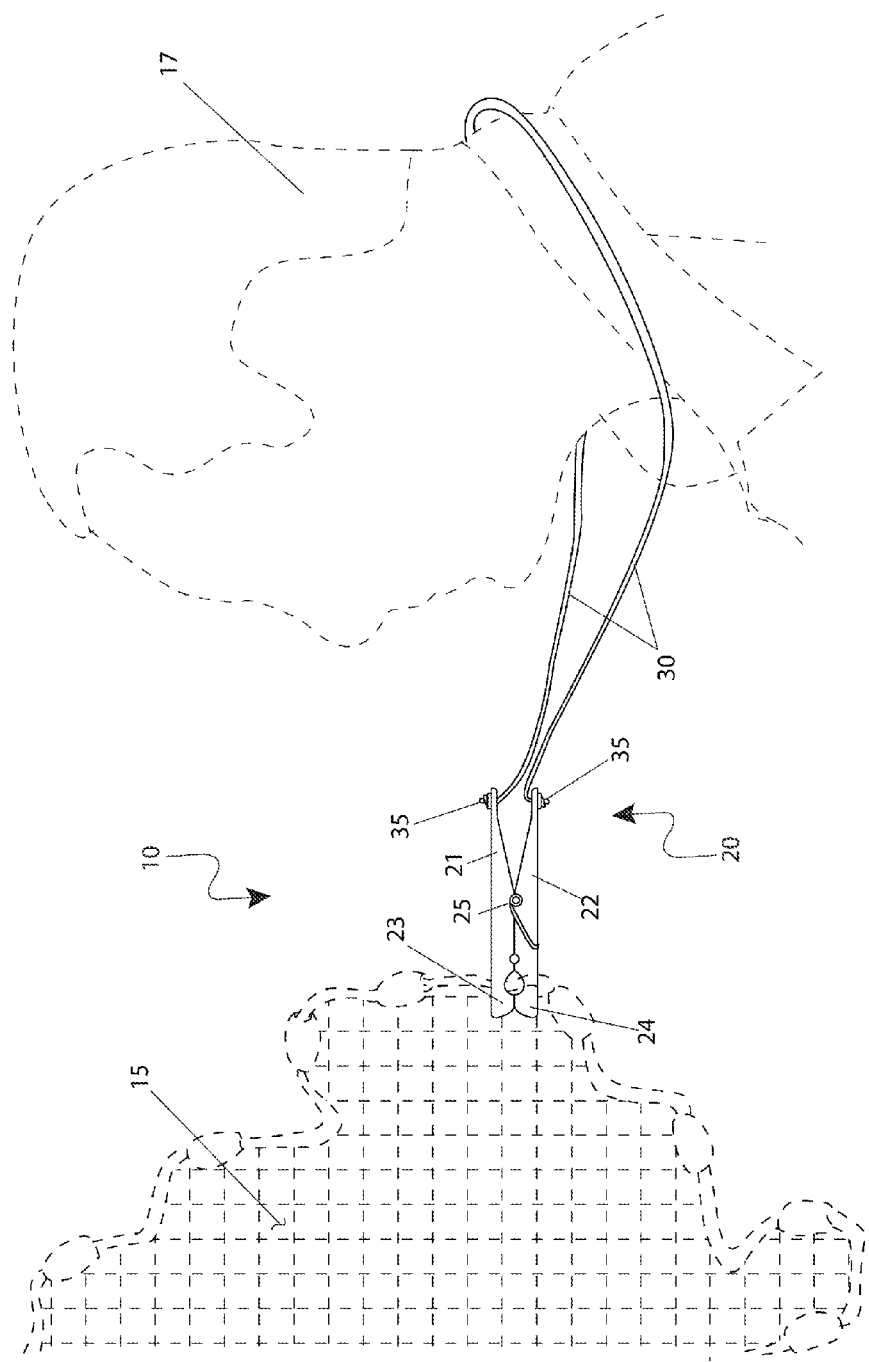
FIG. 1 is an environmental view of a fishing net release device 10, according to a preferred embodiment of the present invention; and, FIG. 2 is a side view of the fishing net release device 10, according to a preferred embodiment of the present invention.
Figure 2:
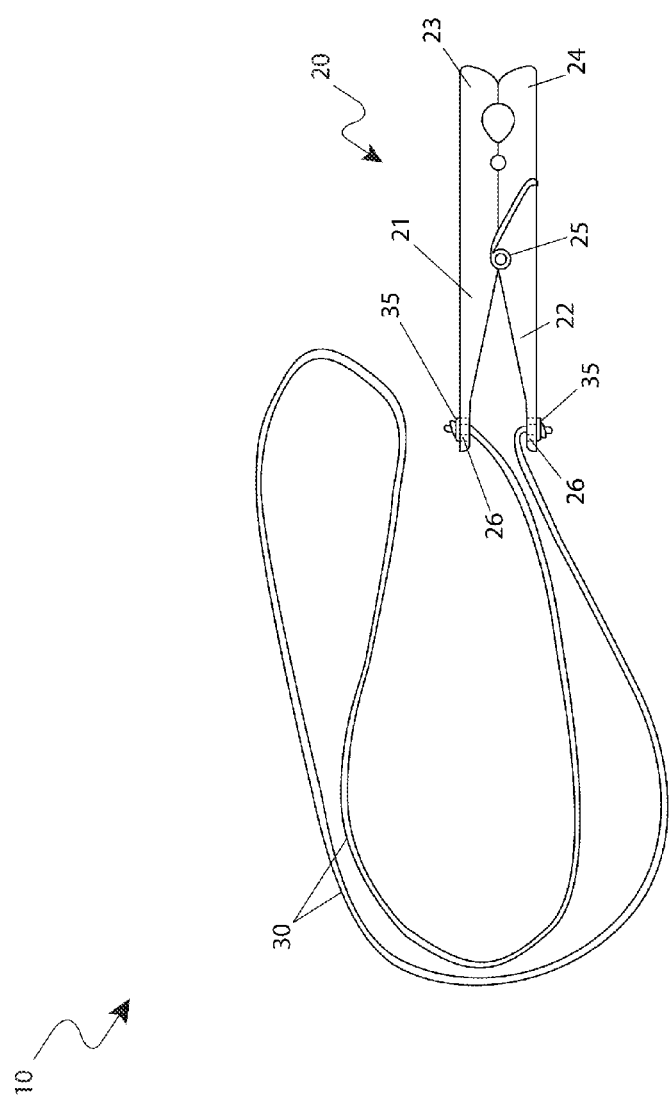

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fishing net release device (herein described as the "device") 10, which provides a means for throwing an existing conventional casting net 15 utilized for catching fish without risking possible teeth damage or the unsanitary conditions which normally result from holding said casting net 15 in a user's 17 mouth. The device 10 comprises a spring clip 20 and a cord 30. Said device 10 is suspended from the neck portion of the user 17 and is attached to the casting net 15, thereby allowing the cast net 15 to travel away from the user 17 and pull away from the spring clip 20 resulting in a perfect cast.

Referring now to FIG. 1, an environmental view of the device 10 and FIG. 2, a side view of the device 10, according to the preferred embodiment of the present invention, are disclosed. The device 10 comprises a conventional spring clip 20 utilized to fasten to the casting net 15 and secure a cord around the user's 17 neck. The spring clip 20 comprises a first elongated member 26, a second elongated member 27, a first jaw 23, a second jaw 24, and a spring 30. The first jaw 23 is located at a distal end portion of the first elongated member 26 and the second jaw 24 is located at a distal end portion of the second elongated member 27. The distal end portions of the elongated members 26, 27 act as a gripping portion and actuator to open the jaws 23, 24. Via depressing the first elongated member 26 toward the second elongated member 27 the jaws 23, 24 open, thereby pivoting a conventional spring 25 and enabling a portion of the casting net 15 to be securely positioned between. Each proximal end portions of the elongated members 26, 27 comprise an aperture 26, thereby allowing an appropriate length of cord 30 to be inserted therein and tied to a desired length to fit the user 17 via a common knot 35 which secures said cord 30 to the spring clip 20. The spring clip 20 is fabricated from materials such as, but not limited to: wood, metal, or the like and is an appropriate dimension to restrain the casting net 15 and cord 30.

The cord 30 is approximately twenty-four (24) to thirty-six (36) inches in length, thereby providing an ample length of said cord 30 to fit a variety of users. Said cord 30 creates a loop that which is suspended around the user's 17 neck portion, thereby positioning the spring clip 20 in a downward manner. Said cord 30 is preferably a nylon rope, yet other synthetic materials may be utilized without limiting the functions of the system 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of installing and utilizing the device 10 may be achieved by performing the following steps: acquiring the device 10; attaching a casting net 15 to the spring clip 20 between the first jaw 23 and second jaw 24, thereby depressing the first elongated member 21 towards the second elongated member 22 and releasing, thereby closing the jaws 23, 24 and fastening to the casting net 15; placing the cord 30 through a corresponding aperture 26 and tying a knot 35 to a desired length; positioning the cord 30 around the neck of a user 17; throwing the casting net 15 in a conventional manner; fishing as usual with the casting net 15; removing the cord 30 from the user's neck portion as necessary; removing the casting net 15 from the spring clip 20 as necessary, thereby depressing the first elongated member 21 towards the second elongated member 22 to open the jaws 23, 24; utilizing the device 10 as necessary; and, throwing a casting net 15 without risking possible teeth damage or the unsanitary conditions which normally result from holding the casting net 15 in the user's 17 mouth.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fishing net release device for reducing danger and unsanitary conditions to a user mouth when throwing a casting net during fishing procedures, said fishing net release device comprising:

a spring clip adapted to be attached to the casting net during casting procedures; and, a cord attached to said spring clip and adapted to be positioned around a user neck, said cord having proximal and distal ends;

wherein said spring clip is adapted to detach from said casting net when the casting net is thrown away from the user mouth;

wherein said spring clip comprises:

first and second elongated members;

first and second jaws located at distal end portions of said first and second elongated members respectively, said distal end portions of said first and second elongated members being adapted to releasably grip the casting net;

a spring mated to said first and second elongated members; and, a plurality of apertures formed through opposing proximal end portions of said first and second elongated members respectively, said apertures facing each other;

wherein said first and second jaws are pivoted to an open position by depressing said proximal end portion of said first elongated member toward said proximal end portion of said second elongated member such that said spring clip is adapted to grip a portion of the casting net, and when said proximal end portions of said first and second elongated members are depressed toward each other the respective apertures are moved toward each other;

wherein said cord is connected to said first and second elongated members;

wherein said cord has a plurality of knots formed at said proximal and distal ends thereof, said knots being inserted into said apertures of said first and second elongated members respectively;

wherein said cord forms a loop adapted to be suspended around the user neck portion such that said spring clip is positioned downwardly to the ground;

wherein said knots are directly coupled to said apertures of said first and second elongated members respectively such that said proximal end of said cord is directly mated to said first elongated member and said distal end of said cord is directly mated to said second elongated member; and, wherein said proximal and distal ends of said cord remain spaced apart while directly coupled to said apertures of said first and second elongated members.

2. A fishing net release device for reducing danger and unsanitary conditions to a user mouth when throwing a casting net during fishing procedures, said fishing net release device comprising:

a spring clip adapted to be removably attached to the casting net during casting procedures; and, a cord attached to said spring clip and adapted to be removably positioned around a user neck, said cord having proximal and distal ends;

wherein said spring clip is adapted to automatically detach from said casting net when the casting net is thrown away from the user mouth;

wherein said spring clip comprises:
  first and second elongated members;
  first and second jaws located at distal end portions of said first and second elongated members respectively, said distal end portions of said first and second elongated members being adapted to releasably grip the casting net;
  a spring mated to said first and second elongated members; and,
  a plurality of apertures formed through opposing proximal end portions of said first and second elongated members respectively, said apertures facing each other;

wherein said first and second jaws are pivoted to an open position by depressing said proximal end portion of said first elongated member toward said proximal end portion of said second elongated member such that said spring clip is adapted to grip a portion of the casting net, and when said proximal end portions of said first and second elongated members are depressed toward each other the respective apertures are moved toward each other;

wherein said cord is connected to said first and second elongated members;

wherein said cord has a plurality of knots formed at said proximal and distal ends thereof, said knots being inserted into said apertures of said first and second elongated members respectively;

wherein said cord forms a loop adapted to be suspended around the user neck portion such that said spring clip is positioned downwardly to the ground;

wherein said knots are directly coupled to said apertures of said first and second elongated members respectively such that said proximal end of said cord is directly mated to said first elongated member and said distal end of said cord is directly mated to said second elongated member;

wherein said proximal and distal ends of said cord remain spaced apart while directly coupled to said apertures of said first and second elongated members.

* * * * *